United States Patent Office 3,423,178
Patented Jan. 21, 1969

3,423,178
TiO₂ PRODUCTION BY CHROMIUM REMOVAL FROM BENEFICIATED TITANIFEROUS ORE
Oswin B. Willcox, Wilmington, Del., assignor to E. I. du Pont de Nemours and Company, Wilmington, Del., a corporation of Delaware
No Drawing. Filed Aug. 12, 1966, Ser. No. 573,135
U.S. Cl. 23—202   9 Claims
Int. Cl. C01g 23/04

This invention relates to the production of white pigment-useful $TiO_2$ products, and more particularly to the purification of beneficiated titaniferous materials to remove color-forming chromium compounds therefrom.

In accordance with the invention, ferrotitaniferous ores, such as ilmenite or rutile, which are essentially ferrous titanate plus other metal impurities, are converted to substantially white $TiO_2$ in pigment-useful state by (1) subjecting a porous, ferrotitaniferous ore previously beneficiated to improve its titanium-to-iron ratio, to heating at temperatures ranging from about 660° C. to 1050° C. for at least 30 minutes in admixture with an extracting agent consisting of an alkali- or alkaline-earth metal tungstate or molybdate, or mixtures of such agents, to solubilize and convert chromium impurities present in said beneficiated ore to water-soluble chromium salts, (2) removing soluble chromium compounds thus formed from the resulting product, and (3) recovering the desired porous titanium dioxide product of improved whiteness and reducing its particle size to desired pigmentary state.

Most commercially available titaniferous ores contain, on a weight basis, between 30 and 65% $TiO_2$, between 20 and 40% iron oxides, and lesser amounts of compounds of other elements such as phosphorous, manganese, vanadium, chromium, tin, zirconium, etc. Since only trace amounts of the colored oxides of iron, vanadium and chromium can be tolerated in titanium dioxide to be used as a pigment, these color-forming elements must either be removed from the pigmentary titanium dioxide or converted to colorless compounds which will not be deleterious to the titanium dioxide pigment.

Previously, two general methods have been resorted to for removing undesired impurities from titaniferous ores to obtain a titanium dioxide product of the desired degree of whiteness for pigment uses. In one, complete dissolution of the ore is effected, generally by means of very strong acid attack, and the titanium dioxide is recovered in a purified form under conditions of differential precipitation. Although such processes will separate the major portion of the titanium dioxide from the major portion of the impurities present in the ore, small amounts of undesired color-forming impurities, notably iron, chromium, and vanadium are coprecipitated with the titanium dioxide, and expensive, complicated after-treatments must be undertaken to remove such objectionable undesired impurities from the pigmentary titanium dioxide product.

In the second general method for preparing titanium dioxide from a titaniferous ore, chlorination of the ore is undertaken, and after separation of contaminating metal chlorides from the $TiCl_4$ product, the latter is oxidized to produce pigmentary titanium dioxide. Although production processes of this type are generally carried out by the expensive procedure of chlorinating completely the metal values in the ores, and then fractionating the metal chlorides, methods of beneficiating the ores as regards their titanium-to-iron ratio are also known. These involve the preferential attack and removal of iron from the ore while the titanium values of the ores are left largely unaffected. For example, U.S. 2,770,529 discloses a process for removing iron from a titaniferous ore by leaching in aqueous acid solution; U.S. 2,120,602 and 2,184,884 disclose the chlorination of iron to form soluble ferric chloride which is then leached from the treated ore; and in U.S. 2,752,300 gaseous hydrogen chloride is employed to effect the chlorination. These procedures have not proved adequately effective in removing undesired color-forming elements or compounds from the titanium dioxide without encountering a substantial loss of titanium values or the undertaking of an extremely expensive purification method.

It is among the objects of this invention to overcome these and other disadvantages which characterize prior attempts at beneficiating and treating a titaniferous ore to enable recovery of a $TiO_2$ product of good color therefrom. It is among the particular objects of this invention to remove chromium and other undesired impurities from a titanium ore and without solubilizing its $TiO_2$ content; to provide novel methods for producing titanium dioxide in a desired state of whiteness as a commodity directly from a previously beneficiated ore; and to retain in the treated, beneficiated ore particles, a porous structure of titanium dioxide which will permit ready and easy comminution of such ore. Other objects and advantages will be apparent from the ensuing description.

In accordance with the invention, improved pigmentary $TiO_2$ products are obtained by purifying a previously beneficiated ferrotitaniferous ore containing a relatively low iron and chromium content, by treating said ore with certain unique extracting agents, particularly an alkali metal compound of tungsten or molybdenum, or mixtures thereof, calcining the treated ore at a temperature near to the fusion point of the extracting agent, but usually within a range of from 660–1050° C., leaching the calcined product with aqueous media to remove the solubilized color-forming chromium compound present, and reducing the leached product to desired pigmentary particle size by recourse to conventional milling or grinding treatment.

In adapting the invention to pratical application, a beneficiated titaniferous ore, such as ilmenite, rutile or titanium slag from which previously and preferably at least 98% of its original iron content has been removed through, for example, a chlorination treatment such as described in U.S. 2,184,884 is employed as the starting material. By such preferential chlorination processes, the structures or residues remaining after iron removal from the ilmenite, rutile ore, titanium slag, etc., advantageously are of extremely high porosity. This porosity is an essential requirement in the beneficiated ore particles because it has been found necessary that the chromium-removing reagents shall come in direct contact with the chromium compounds present in the beneficiated particles to form compounds which can subsequently be removed upon water leaching.

Using known chlorination procedures, such as those above referred to, a sample of Florida ilmenite ore and a sample of Australian rutile ore were beneficiated and each ore sample was subsequently run through a magnetic separator. Analyses of the ores before beneficiation and after beneficiation and magnetic separation are shown in the following Table I.

TABLE I

| (a) Florida (ilmenite) | Ore, percent | Beneficiated product with magnetic treatment, percent |
| --- | --- | --- |
| $TiO_2$ | 64 | 97.4 |
| Fe | 21.3 | 0.05 |
| Cr | 0.10 | 0.05 |
| $SiO_2$ | 0.30 | 0.20 |
| $Al_2O_3$ | 1.5 | 0.40 |
| $MnO_2$ | 1.35 | 0.002 |
| $V_2O_5$ | 0.13 | 0.02 |

| (b) Australian (rutile) | Ore, percent | Beneficiated product with magnetic separation, percent |
| --- | --- | --- |
| $TiO_2$ | 98.1 | 98.2 |
| Fe | 0.24 | 0.09 |
| Cr | 0.05 | 0.05 |
| $SiO_2$ | 0.12 | 0.12 |
| $Al_2O_3$ | 0.10 | 0.10 |

The beneficiated ore particles thus obtained are desirably porous and frangible. Reduction of the chromium content of these ore particles to a level of about 0.005% by weight (or about 5% of the original chromium content) is brought about by intimately mixing the ore particles with sufficient of an alkali metal tungstate or molybdate, or mixture thereof, as will induce on subsequent calcination of the mixture at a temperature in the range of about 660° C. to about 1050° C., conversion of the chromium to a corresponding water-soluble chromate. In admixing the ore and tungstate and molybdate salts proportions, by weight, of from about 4:1 to 1:1 can be used, and in the calcination an oxidizing atmosphere should be used. The ore-salt ingredients can be dry mixed in any desired manner. Preferably however a thick salt paste is formed by adding sufficient water to the salt and then the paste is mixed with the ore particles. The use of a wet paste will prove advantageous since it permits penetration of the salt into the ore particle and speeds the reaction. If desired, briquettes in a size of about ¾″ by 1″ in diameter can be used since they make a desirable kiln feed material. The calcination treatment of the ore-salt mixture is carried out in any conventional, desired type of furnacing means, but preferably is effected in a rotary ceramic-lined kiln operating under an oxidizing atmosphere and is conducted for a period of at least 30 minutes at the indicated 660°–1050° C. temperature. Preferably, the time period of calcination ranges from 45–60 minutes, and to secure optimum results, the calcination is carried out at about the fusion point of the salt mix, that is between 25° C. below to 100° C. above said fusion point.

Upon completion of the calcination, the calcined product is discharged from the calciner, cooled, and then leached in aqueous media. Alternatively the product can be discharged hot from the calciner directly into a leaching solution such as water, or a dilute mineral acid solution such as one containing 10% HCl or $H_2SO_4$. In the leaching operation usually about 10–20 volumes of leaching solution are required. Where acid is used, water should be employed at the end of the leach step in order to effect removal of any excess acid present.

Insoluble titanium dioxide remaining after the leaching operation is separated out and recovered by means of filtration and is then dried. The overall yields of 96–98% of the $TiO_2$ product will be found to consist of a porous white titanium dioxide product which may be subjected to a conventional grinding treatment to reduce the particles to small, uniform pigmentary size of about 1 micron. While the product is not equal in whiteness to the very best commercially available $TiO_2$ pigments, it proves very useful as a pigmenting substance in such applications as porcelain enamels, roofing granules, paper pigments, and as a plastic delustrant, or in tinted paints and glass.

To a clearer understanding of the invention the following specific examples are given. These are merely illustrative of particular applications of the invention and are not to be construed as limiting its underlying principles and scope.

Example I

Samples of a beneficiated ilmenite ore having substantially the composition shown in Table I above, were treated with sodium tungstate, sodium molybdate, and potassium molybdate, calcined, and leached to remove chromium salts therefrom. The particulars as to each treatment, the amounts of salts used and the ratio of salt to ore, as well as the duration and temperature of calcination employed and analytical results obtained on the leached products are shown in Table II below. In each treatment, unground ore of approximately 20 mesh size, obtained from the beneficiating step as described above, was mixed with the dry extracting salt, and was then mixed with water until a thick paste tacky enough to stick to a spatula was formed. The resulting ore-paste was calcined in air at the temperatures shown in said Table II, and the calcined product washed, first with 0.1 M HCl and then in water to remove from the insoluble $TiO_2$ residue the soluble salts formed in the calcination. From these operations a valuable white, pigment useful $TiO_2$ was obtained.

TABLE II

| Salt used and ratio (wt.), salt to ore | Temperature and time | $Cr_2O_3$ Analyses, p.p.m. | |
| --- | --- | --- | --- |
| | | Original ore | After treatment by process of the invention |
| $Na_2WO_4$: | | | |
| 1:1 | 870° C., 45 min | 900 | 140 |
| 1:1 | 870° C., 45 min | 900 | 160 |
| 1:1 | 870° C., 45 min | 900 | 130 |
| 3:4 | 870° C., 45 min | 1,830 | 310 |
| 3:4 | 750° C., 75 min | 1,830 | 330 |
| $Na_2MoO_4$: | | | |
| 1:1 | 870° C., 45 min | 900 | 60 |
| 1:2 | 870° C., 45 min | 1,830 | 90 |
| 1:2 | 840° C., 75 min | 1,830 | 180 |
| 3:4 | 750° C., 75 min | 1,830 | 105 |
| $K_2MoO_4$: | | | |
| 1:1 | 870° C., 45 min | 900 | 65 |
| 3:4 | 870° C., 45 min | 1,830 | 33 |
| 1:2 | 870° C., 45 min | 1,830 | 89 |
| 1:4 | 870° C., 45 min | 1,830 | 140 |
| 3:4 | 750° C., 75 min | 1,830 | 220 |
| 3:4 | 770° C., 45 min | 1,830 | 140 |
| 3:4 | 870° C., 45 min | 1,830 | 33 |
| 1:2 | 900° C., 30 min | 1,830 | 150 |
| 3:4 | 940° C., 45 min | 1,830 | 90 |
| $K_2MoO_4$: | | | |
| 3:4 | 870° C., 45 min | 1,410 | 68 |
| 3:4 | 870° C., 45 min | 1,410 | 67 |
| 3:4 | 870° C., 45 min | 68 | 0 |

As shown in the above example, use can be made of various alkali metal tungsten- and molybdenum-containing extracting agents in accordance with the invention to yield white titanium oxide product. Analyses of the final products from these tungstate and molybdate treatments revealed that they contained approximately 1% tungsten and 0.1% molybdenum or less, depending on the treating agent used. In addition to the compounds mentioned above tungstates and molybdates of other alkali metals, such as of rubidium and cesium also can be employed, as can various mixtures of alkali metal tungstates and molybdates.

The process of this invention is unique because one can obtain relatively pure white $TiO_2$ by dissolving out chromium impurities from a porous residue of a titania-containing ore from which iron has been removed by means of a prior treatment. It provides an inexpensive economical method for preparing a porous white $TiO_2$ pigment-useful product containing greater than 99% $TiO_2$ and directly from a beneficiated titaniferous ore.

I claim:
1. A method for removing a chromium contaminant from a beneficiated titanium-containing material to obtain a white, porous, pigment-useful $TiO_2$ product, comprising intimately mixing said beneficiated material with an extractant selected from the group consisting of alkali metal molybdates and tungstates and their mixtures, calcining the resulting mixture at a temperature in the range of from about 660° C. to about 1050° C. for at least 30 minutes in an oxidizing atmosphere, removing from the calcined product water-soluble chromium compounds formed in the calcination and recovering the resulting porous white $TiO_2$ product.

2. The process of claim 1 in which the extractant is an alkali metal tungstate present in a proportion, by weight, of titanium-containing material to extractant of from 4:1 to 1:1.

3. The process of claim 2 in which the extractant is an alkali metal molybdate.

4. The process of claim 2 in which the extractant is an alkali metal tungstate.

5. The process of claim 2 in which the titanium-containing material is a titaniferous ore and the extractant is sodium tungstate.

6. The process of claim 2 in which the titanium-containing material is a titaniferous ore and the extractant is potassium tungstate.

7. The process of claim 2 in which the titanium-containing material is a titaniferous ore and the extractant is sodium molybdate.

8. The process of claim 2 in which the titanium-containing material is a titaniferous ore and the extractant is potassium molybdate.

9. The process of claims 7 and 8 in which the calcination is carried out at between 25° C. below to 100° C. above the fusion point of the ore-extractant mixture.

References Cited

UNITED STATES PATENTS

| 1,845,633 | 2/1932 | Specht | 23—202 |
| 2,170,940 | 8/1939 | Dahlstrom | 23—202 XR |
| 2,702,757 | 2/1955 | Bahnsen | 23—202 XR |
| 2,960,387 | 11/1960 | Wainer | 23—202 |
| 3,063,807 | 11/1962 | Kenworthy | 23—202 |

OTHER REFERENCES

"Titanium" book by Jelks Barksdale, 1949 ed., p. 123, The Ronald Press Co., New York.

EARL C. THOMAS, *Primary Examiner.*

EDWARD STERN, *Assistant Examiner.*

U.S. Cl. X.R.

23—312; 75—1